Aug. 14, 1934.　　F. M. YOUNG ET AL　　1,970,481
PROCESS OF BONDING FINS TO RADIATOR TUBES
Filed March 9, 1933
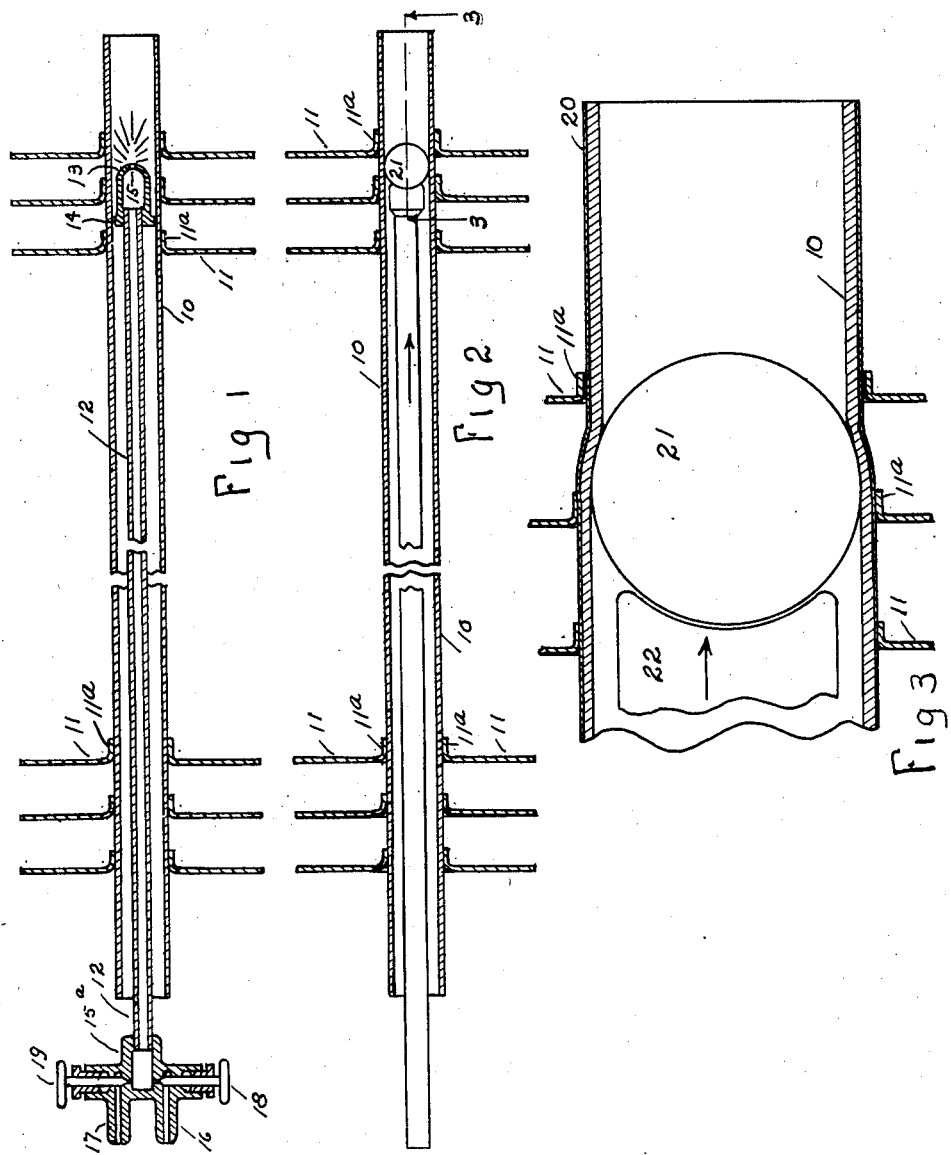
INVENTOR.
Fred M. Young
Leon M. Young
BY  A. S. Krotz
ATTORNEY.

Patented Aug. 14, 1934

1,970,481

UNITED STATES PATENT OFFICE 1,970,481

PROCESS OF BONDING FINS TO RADIATOR TUBES

Fred M. Young and Leon M. Young, Racine, Wis.; said Leon M. Young assignor of one-half to Young Radiator Company, Racine, Wis.

Application March 9, 1933, Serial No. 660,114

1 Claim. (Cl. 29—157.3)

Our invention relates to the class of device and process used for bonding fins to radiator or heat conducting tubes and has for its object an economical and successful bond between these parts.

Radiator or heat transferring devices for which our invention is particularly adapted are frequently ten feet in length. Therefore, the dipping and other common processes are difficult, uncertain and expensive. The object of our invention is to economically and successfully bond fins to tubes of any desired length, either separately or after they have been assembled to the headers.

An object of our invention is to facilitate the assembling of fins on the tubes by providing openings in the fins slightly larger than is common practice, and then after the assembly to enlarge the tubes to thereby cause the fins to more closely embrace the tubes.

We accomplish these objects by the use of our novel torch and by our novel tube expanding device wherein we, first, coat the surface of the tube with bonding material; second, place the fins on the tube; third, expand the tube internally to thereby cause the fin flanges to tightly embrace the tube; fourth, heat the tube internally by means of the torch placed within the tube, the flame of which is self-sustaining and of limited area, beginning at one end and then gradually moving the torch or flame through the tube and at a speed which will insure intimately bonding together the fins and tube.

With these and other useful ends our invention consists of matter hereinafter set forth and claimed and shown in the accompanying drawing in which:

Figure 1 is a fractional sectional view of a radiator tube and some of the fins assembled thereon showing our improved torch inserted therein and in the starting position for the bonding.

Figure 2 is a sectional fractional view of a tube assembly showing the tube expanding device as being forced through the tube as indicated by arrow.

Figure 3 is a fractional enlarged or exaggerated section taken on line 3 of Figure 2.

As thus illustrated, it will be seen that our invention consists of a novel heating torch and a novel expanding device which are dependent upon a certain order of assembling for their successful operation.

In the various figures the numeral 10 designates the tube of a radiator or heat transferring device. Numeral 11 designates the fins which may be of any desired type, and are provided with flanged openings through which the tubes extend as at 11ª, it being understood that the fins may enclose individual tubes or be large enough to embrace a row or two rows of tubes or any desired grouping of tubes. The tubes may be of any desired shape. As a matter of convenience we have shown these tubes as being round.

Our improved torch comprises tube 12 which must be of a length suitable for the tube 10 length. A head 13 is provided and suitably made fast to the end of tube 12 and is provided with flange guide 14 whereby the head is held in a central position. An orifice 15 is provided of a suitable shape and size whereby the flame will be restricted to a limited area or size.

On the other end of tube 12 we provide a mixing head 15ª comprising two rubber hose connections 16 and 17 and two needle valves 18 and 19 whereby to regulate the relative quantity and pressure of gas in the tube 12. Suitable connections are made between 16 and 17 to a supply of oxygen and gas. We find in practice that the common city gas is suitable for this purpose and with a proper orifice in head 15 a self-maintaining flame of the proper size is provided.

The tube to which the fins are to be bonded is first coated with the bonding material 20 as indicated in Figure 3. The flanged openings in fins 11 are preferably made slightly larger than is common practice in order to facilitate their assembling on the tubes, after which the ball 21 which is slightly larger than the opening in the tube is forced through the tube 10 either by means of plunger 22 or otherwise, thus to slightly enlarge the tube and cause the flanges to more tightly embrace the tubes.

A suitable flux is applied to the joints between the fins and tubes by means of a spray or by dipping, or otherwise, before or after the fins have been assembled on the tube, after which the torch is used to bond the fins to the tubes as follows:

The flame size and intensity is first found by adjusting valves 18 and 19. The flame is then moved slowly through the tube at a speed which will insure melting the bonding material on the tube and intimately bonding the flanges consecutively to the tube as the flame is moved through the tube.

Obviously, the flux may be applied in various forms and at various times during the process. One plan we contemplate is to apply it to the tube before the fins are assembled thereon, and it will be understood that under some conditions the operation of expanding the tube may be dispensed with or some other means used other than a ball for the purpose, or the ball may be pulled through the tube instead of pushing it through by means of a bar or rod as shown. And while we describe city gas as most suitable to be used with oxygen, some other gas might in time be found more desirable. Therefore, it will be understood that various changes in apparatus and process may be made without departing from the spirit of the invention.

Having thus shown and described our invention what we claim as new and desire to secure by Letters Patent is:

A method of bonding heat conducting fins to a tube which consists in first coating the exterior of the tube with suitable bonding material, next inserting the tube into a multiplicity of fins having flanged openings therefor, next expanding the tube to thereby cause said flanged openings in the fins to more snugly embrace the tube, next inserting a torch into the tube, said torch comprising a mixing head at one end of a tube and a torch head at the other end thereof, said torch head having means to thereby hold the same centrally in the tube and an orifice at the end thereof, whereby a flame of limited area is self maintained in the tube, next moving the flame slowly through the tube whereby to fuse the bonding material and bond the flanged openings to the tube in consecutive order.

FRED M. YOUNG.
LEON M. YOUNG.